April 7, 1964 S. HACKNEY ETAL 3,128,235
FUEL ELEMENTS FOR NUCLEAR REACTORS
Filed Jan. 19, 1959 6 Sheets-Sheet 3

INVENTORS
STANLEY HACKNEY
ERNEST EDWARD JERKINS

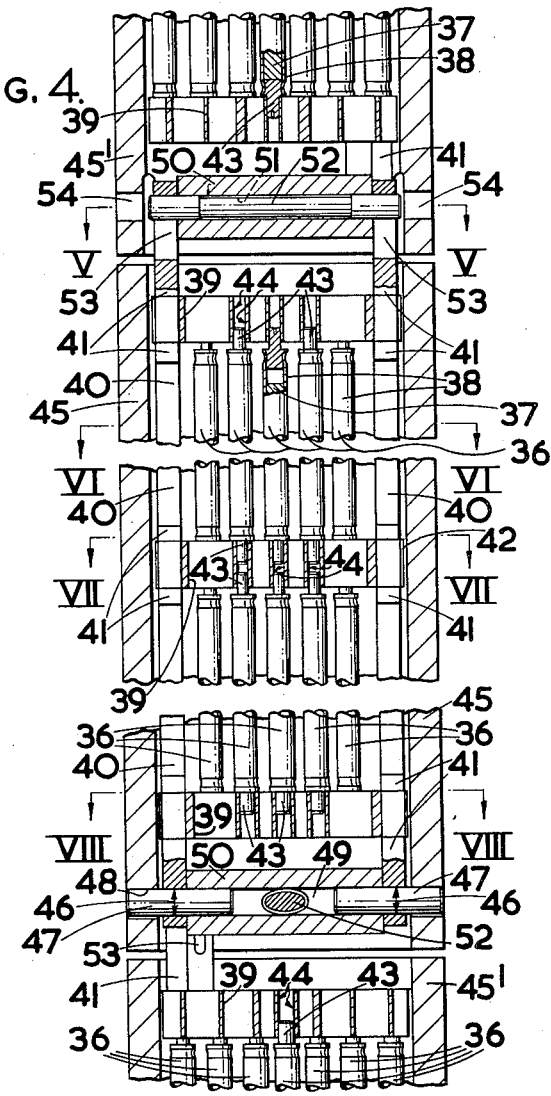

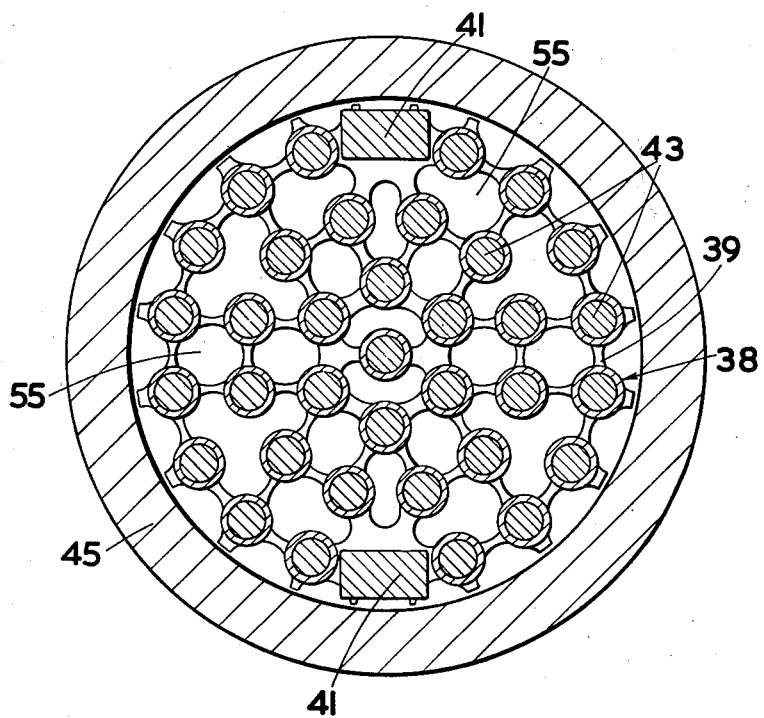

INVENTOR
STANLEY HACKNEY
ERNEST EDWARD JERKINS

United States Patent Office 3,128,235
Patented Apr. 7, 1964

3,128,235
FUEL ELEMENTS FOR NUCLEAR REACTORS
Stanley Hackney, Fearnhead, Warrington, and Ernest Edward Jerkins, Culcheth, Warrington, England, assignors to United Kingdom Atomic Energy Authority, London, England
Filed Jan. 19, 1959, Ser. No. 787,430
Claims priority, application Great Britain Jan. 24, 1958
3 Claims. (Cl. 176—77)

This invention relates to fuel elements for nuclear reactors.

An object of the invention is to provide an improved fuel element suitable for use in a gas-cooled nuclear reactor operating at temperatures of the order of 500–600° C.

A fuel element according to the invention comprises stacks of clusters of sheathed nuclear fuel members, said sheathed members being located at both ends in support plates so that their weight is carried from one end and the other end is free to expand, spacers for the support plates such that the assembly of sheathed members, plates and spacers forms a self-supporting body, and a graphite sleeve supporting said body from one end and allowing expansion at the other end.

Constructional examples embodying the invention will now be described with reference to the accompanying drawings, wherein:

FIGURE 4 is a fragmentary side view in medial section and illustrates connected fuel elements in another construction.

FIGURES 5, 6, 7 and 8 are plan views in section on lines V—V, VI—VI, VII—VII and VIII—VIII respectively.

Figure 1:
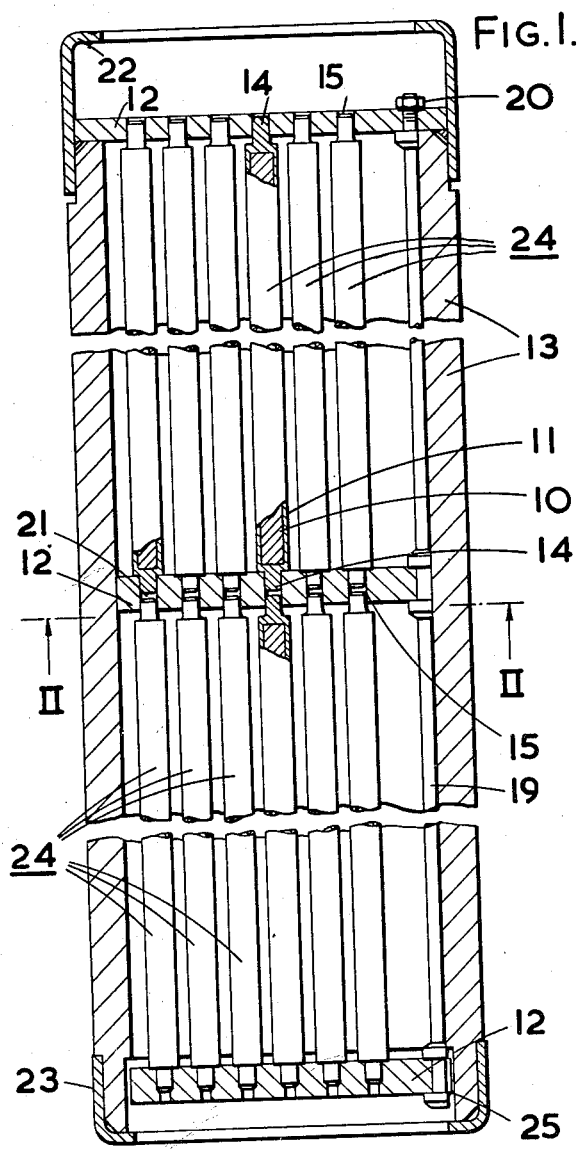
FIGURE 1 is a fragmentary side view in medial section and illustrates one construction of fuel element.
Figure 2:
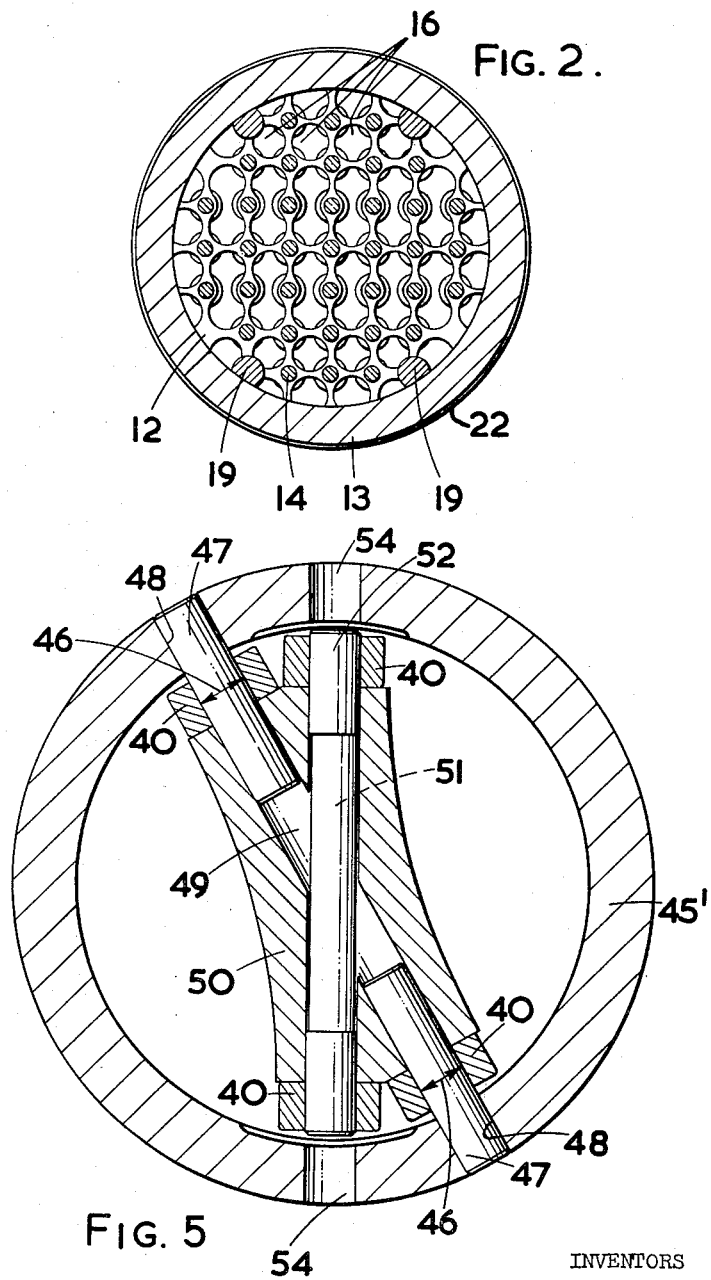
FIGURE 2 is a plan view from beneath on line II—II of FIGURE 1.

Referring to the drawings, in the construction shown in FIGURES 1 and 2 thereof, clusters 24 of uranium dioxide rods 10 sheathed in beryllium cans 11 are stacked on beryllium support plates 12 in a graphite sleeve 13. The cans 11 have end location studs 14 at both ends which locate in holes 15 in the support plates 12. The support plates 12 are held in position by shouldered spacer bars 19 entering slots 25 in the plates 12 and the plates 12 are clamped between the bars by means of nuts 20 acting on the top support plate 12. Spaces 21 are left between adjacent locating studs 14 to allow for expansion of the fuel rods 10 and cans 11, and holes 16 allow coolant flow through the plates 12. The top support plate 12 is supported by the graphite sleeve 13 and is welded to an annular beryllium end cap 22 which locates the upper end of the graphite sleeve 13 and also provides a means for lifting and lowering the assembly of sleeve 13 and clusters 24 which forms the fuel element. A second annular beryllium end cap 23 is press-fitted around the lower end of the sleeve 13. It acts as a bottom support and as a guide when the fuel element is loaded in a fuel element channel in a nuclear reactor.

The holes 16 in the plates 12 are made so that their total cross-sectional area approximates to the cross-sectional area of the flow paths between the sheathed fuel members.

Figure 3:
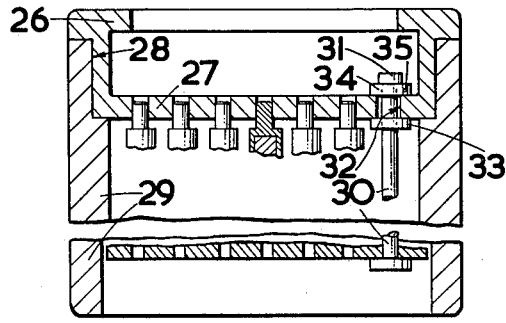
FIGURE 3 is a similar view to that of FIGURE 1 and illustrates a modification.
Figure 6:
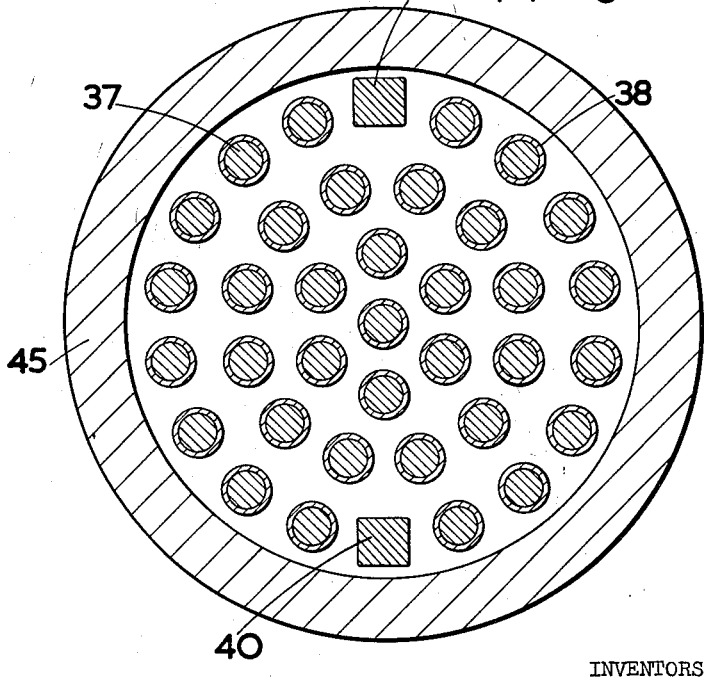
Figure 8:
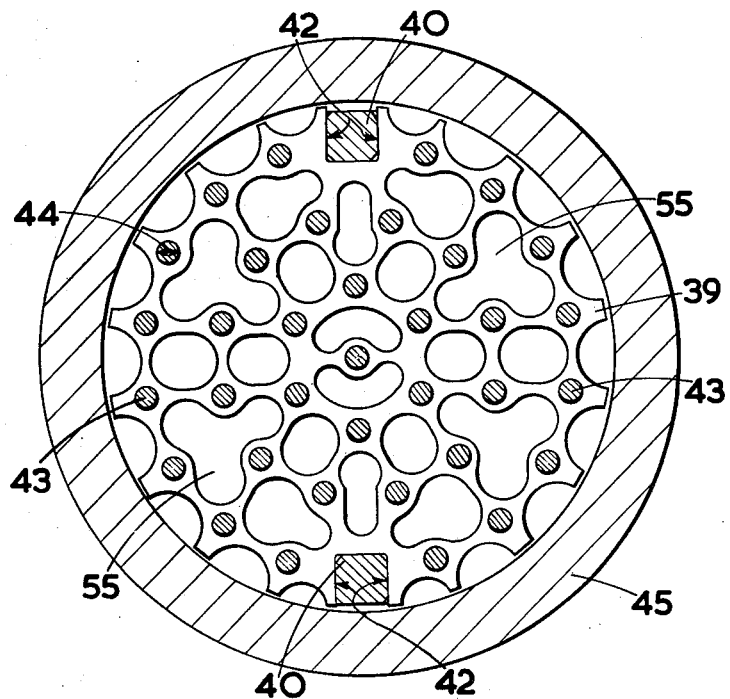

In a modification, illustrated in FIGURE 3, the construction is similar to that hereinbefore described except that, instead of the beryllium end cap 22, an end rim 26 of beryllium is made integral with the top support plate 27 (which in other respects is similar to the top support plate 12 of FIGURE 1) and is carried in an annular recess 28 in the top of the graphite sleeve 29. There is no bottom end cap, and the bottom of the graphite sleeve 29 rests on the end rim of the adjacent fuel element beneath. This expedient prevents the possibility of self-welding of beryllium end caps to one another as might occur with the construction shown in FIGURE 1 at extreme temperature. Furthermore, instead of the spacer bars 19, tie rods 30 (one of which is shown in FIGURE 3) are provided. Each tie bar 30 has at its upper end a head 31 adapted to pass through an aperture 32 in the support plate 27, the tie bar also having a flange 33 and being clampable to the support plate 27 by means of a C-clip 34 and pin 35 disposed between the plate 27 and the head 31.

In another construction, illustrated in FIGURES 4–8, a fuel element has clusters 36 of uranium dioxide rods 37 sheathed in beryllium cans 38 and stacked between beryllium support plates 39 held between shoulders 41 on diametrically opposed beryllium tie rods 40 engaging grooves 42 in the plates 39. The cans 38 have end location studs 43 which locate in apertures 44 in the support plates 39, spaces being left between adjacent studs 43 to allow for expansion of the rods 37 and cans 38. The support plates 39 have apertures 55 located between the apertures 44 to enable coolant to flow along in contact with the clusters 36, the apertures 55 being such that their total cross-sectional area approximates to the cross-sectional area of the flow paths between the sheathed fuel members. The support plates 39 are disposed with clearance within a graphite sleeve 45 so that they can move on expansion longitudinally relative to the sleeve 45. The bottom ends of the tie rods 40 have apertures 46 engaged by pins 47 engaged at their outer ends within apertures 48 in the graphite sleeve 45 and at their inner ends within a through aperture 49 in a beryllium block 50. The block 50 also has a through aperture 51 which breaks into the aperture 49 but whose axis is offset relative to the axis of the aperture 49 (see particularly FIGURE 5). The aperture 51 contains a pin 52 whose ends project from the block 50 but are clear of the graphite sleeve 45' of the adjacent element, the upper ends of the tie rods 40 having slots 53 engaging the said projecting ends of the pin 52. The respective graphite sleeve 45' has apertures 54 by means of which the pin 52 can be engaged and removed to uncouple adjacent fuel elements.

It will be appreciated that the hereinbefore described construction enables fuel elements to be coupled to one another in a manner which allows a degree of flexibility between elements in the sense that the longitudinal axis of one element can be moved out of alignment to a limited extent relative to the longitudinal axis of the adjacent element coupled to it. In the normal manner, a connected string of fuel elements is suspended within the fuel element channel of a nuclear reactor, and in the cold condition, there is clearance between the graphite sleeves 45 and 45' and the upper end walls of the slots 53 of tie rods 40 rest on the pin 52. On subjection to nuclear heating, the clearance between the graphite sleeves 45, 45' becomes taken up by longitudinal expansion of the sleeves, whereby leakage of coolant gas as it flows within the sleeves is reduced to a minimum. The tie rod 40 and the fuel rod cans 38 connected to them via the support plates 39 expand upwardly from their fixed lower ends and to a different degree compared with the graphite sleeves, but the differential expansion is taken up by the slots 53 in the upper ends of the tie rods so that unwanted stresses due to differential expansion are prevented.

It will be noted that whilst the fuel members in the construction described with reference to FIGURES 1 and 2 are arranged on a square lattice those described with reference to FIGURES 4 to 8 are arranged on a circular lattice. The latter arrangement provides a more symmetrical arrangement of the fuel members within the graphite sleeve,

We claim:

1. For a nuclear reactor, a fuel element comprising, in combination, an assembly comprising first, second and third plate members spaced beyond one another on a common axis and having a lattice of holes defined therein, a first spacer bar disposed between the opposed faces of the first and second plate members, a second spacer bar disposed between the opposed faces of the second and third plate members, means clamping both the plate members and the spacer bars together, a first cluster of elongated fuel members disposed lengthwise between the first and second plate members and end located by holes therein, a second cluster of elongated fuel members disposed lengthwise between the second and third plate members and end located by holes therein, a sleeve member disposed lengthwise about said assembly and means attaching said assembly to said sleeve member.

2. For a nuclear reactor, first and second fuel element assemblies, each assembly comprising first, second and third plate members spaced beyond one another on a common axis and having a lattice of holes defined therein, tie rods extending between and secured to said first, second and third plate members, a first cluster of elongated fuel members disposed lengthwise between the first and second plate members and end located by holes therein, a second cluster of elongated fuel elements disposed lengthwise between the second and third plate members and end located by holes therein, graphite sleeve means enclosing with clearance said assemblies, means attaching one of said tie rods to said sleeve member and coupling one end of the first fuel element assembly with one end of the second fuel element assembly, said means comprising a block, a first pair of pins pivotally connecting the block with the tie rods at one end of the first fuel element assembly and with the sleeve member and a second pair of pins pivotally connecting the block with the tie rods at one end of the second fuel element assembly.

3. In a nuclear reactor according to claim 2 wherein said second pair of pins is offset relative to said first pair of pins.

References Cited in the file of this patent

UNITED STATES PATENTS

| 2,773,823 | Goett | Dec. 11, 1956 |
| 2,832,733 | Szilard | Apr. 29, 1958 |
| 2,848,404 | Treshow | Aug. 19, 1958 |
| 2,851,410 | Vernon et al. | Sept. 9, 1958 |
| 2,852,456 | Wade | Sept. 16, 1958 |
| 2,898,280 | Schultz | Aug. 4, 1959 |
| 2,985,575 | Dennis et al. | May 23, 1961 |

FOREIGN PATENTS

| 791,011 | Great Britain | Feb. 19, 1958 |